RECONNAISSANCE SYSTEM

Filed Jan. 11, 1960 3 Sheets-Sheet 1

INVENTORS
JOHN W. BEATTY
DAVID R. POWER
BY
Wade Koontz
S. A. Strickland
ATTORNEYS April 3, 1962 D. R. POWER ETAL 3,028,449

RECONNAISSANCE SYSTEM

Filed Jan. 11, 1960 3 Sheets-Sheet 2

INVENTORS.
JOHN W. BEATTY
DAVID R. POWER

BY

Wade Koontz
S. A. Stricklett
ATTORNEYS

RECONNAISSANCE SYSTEM

Filed Jan. 11, 1960 3 Sheets-Sheet 3

INVENTORS
JOHN W. BEATTY
DAVID R. POWER
BY Wade Koontz, Jr.
S. A. Stricklett
ATTORNEYS

United States Patent Office 3,028,449

Patented Apr. 3, 1962

3,028,449

RECONNAISSANCE SYSTEM

David R. Power and John W. Beatty, Dayton, Ohio, assignors to the United States of America as represented by the Secretary of the Air Force Filed Jan. 11, 1960, Ser. No. 1,828

4 Claims. (Cl. 178—6.6)

(Granted under Title 35, U.S. Code (1952), sec. 266)

The invention described in the following specification and claims may be manufactured and used by or for the Government for governmental purposes without the payment to us of any royalty thereon.

This invention relates to a reconnaissance system for mounting in airborne vehicles and, particularly, to a reconnaissance system for mounting in satellites, space probes and the like either within or outside the earth's atmosphere and utilizing optical and magnetic means for avoiding radiation interference.

Considerable difficulty has been encountered in recording and transmitting intelligence by means of airborne reconnaissance equipment, such as satellites or space probes, because of the presence of charges, particles or radiation fields which interfere with the operation of electronic pickup and photographic devices. The present invention provides a system for receiving, recording, storing and transmitting intelligence by means of an airborne reconnaissance device utilizing optical observing and magnetic recording and read-out devices which are substantially immune to radiation interference.

In the construction according to the invention, an optical system is utilized to provide an image of an objective terrain in the focal plane of a lens system. A plurality of photoelectric cells are successively traversed through the focal plane to produce bits of information which are amplified and recorded on a magnetic tape which is stored until such time as favorable transmittal conditions exist, at which time the stored information is transmitted and the tape erased and returned to service. Since a greater or lesser period may intervene between periods of successful transmission, a plurality of recording tapes are arranged so that a plurality of tapes may be recorded and held in abeyance until such time as successful transmission can be accomplished.

Accordingly, an object of the invention is to provide an improved reconnaissance device.

It is a further object of the invention to provide a reconnaissance device having a means to store information over long periods of time.

It is a further object of the invention to provide a reconnaissance system in which the recording tapes may be repeatedly used.

It is still another object to provide a system substantially immune to radiation.

It is still a further object of the invention to provide a system utilizing optical pickup and magnetic recording and read-out devices.

It is one object of the invention to provide a plurality of banks of information storage devices.

Other objects and advantages will be apparent from the following detailed description taken in conjunction with the accompanying drawings in which.

Figure 1:
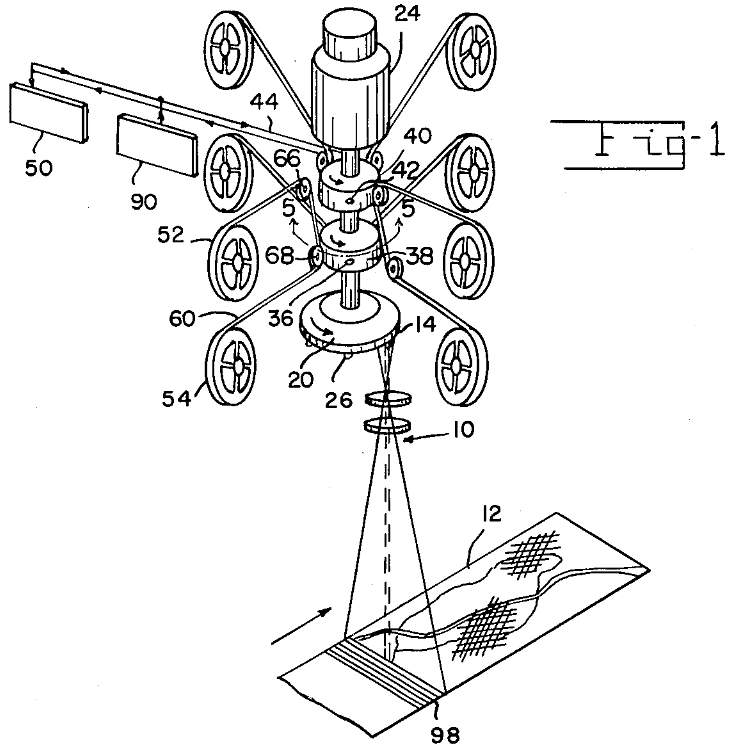
FIG. 1 is a schematic view showing the general arrangement of the system.
Figure 5:
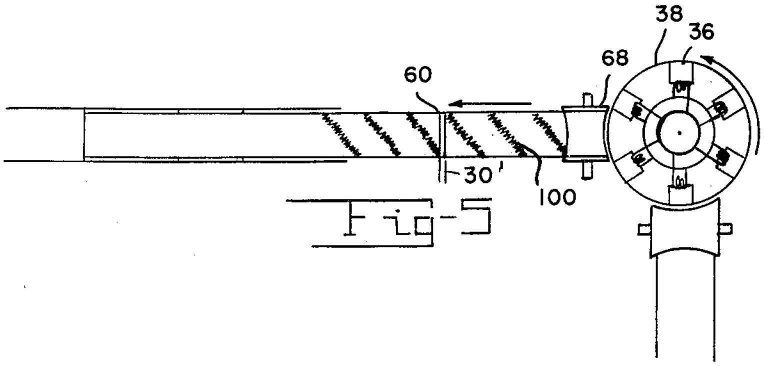
FIG. 5 is a view taken substantially on the plane indicated by the line 5—5 of FIG. 1 and showing the recording arrangement.
Figure 2:
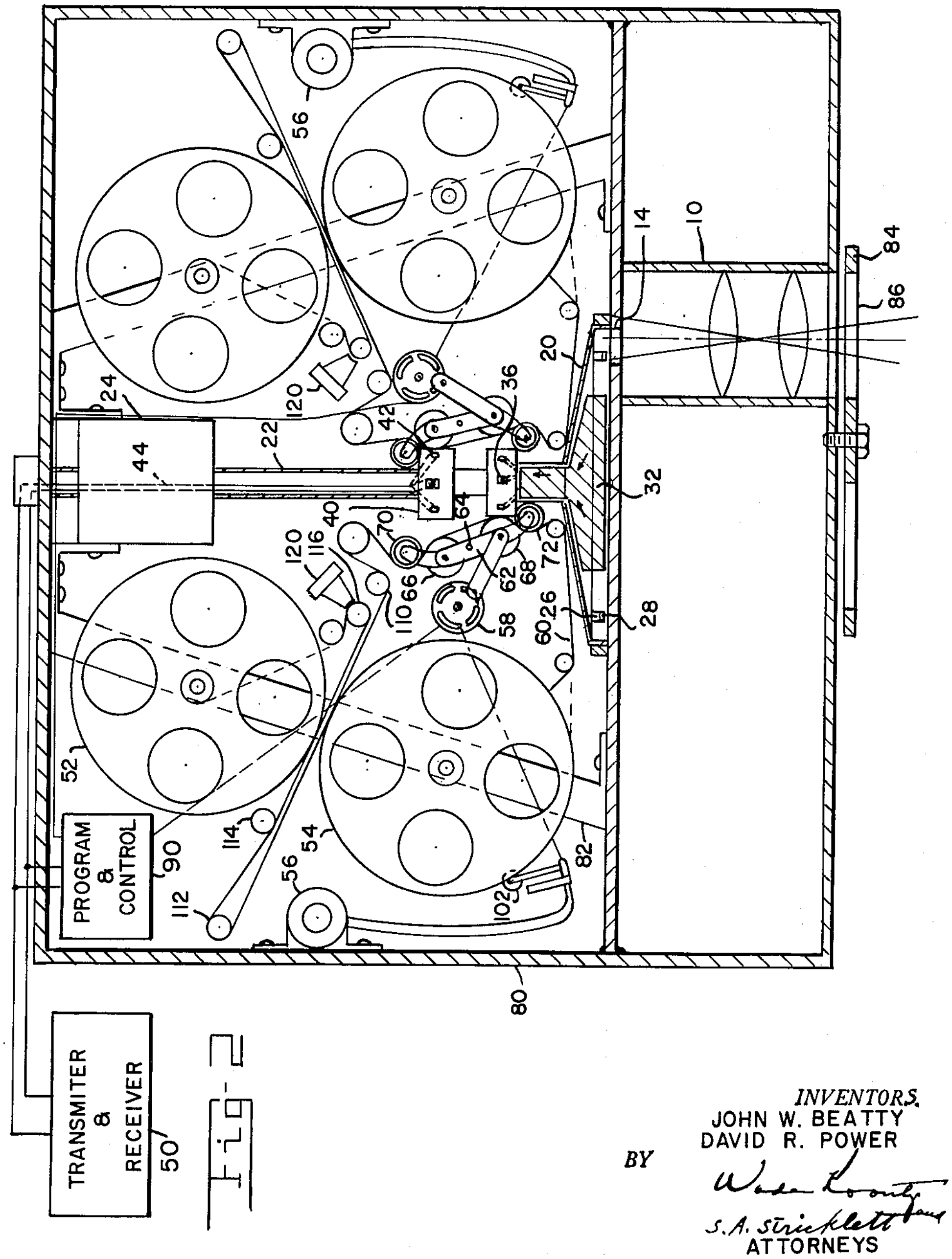
FIG. 2 is a vertical elevation with parts broken away and in section.
Figures 3, 4:
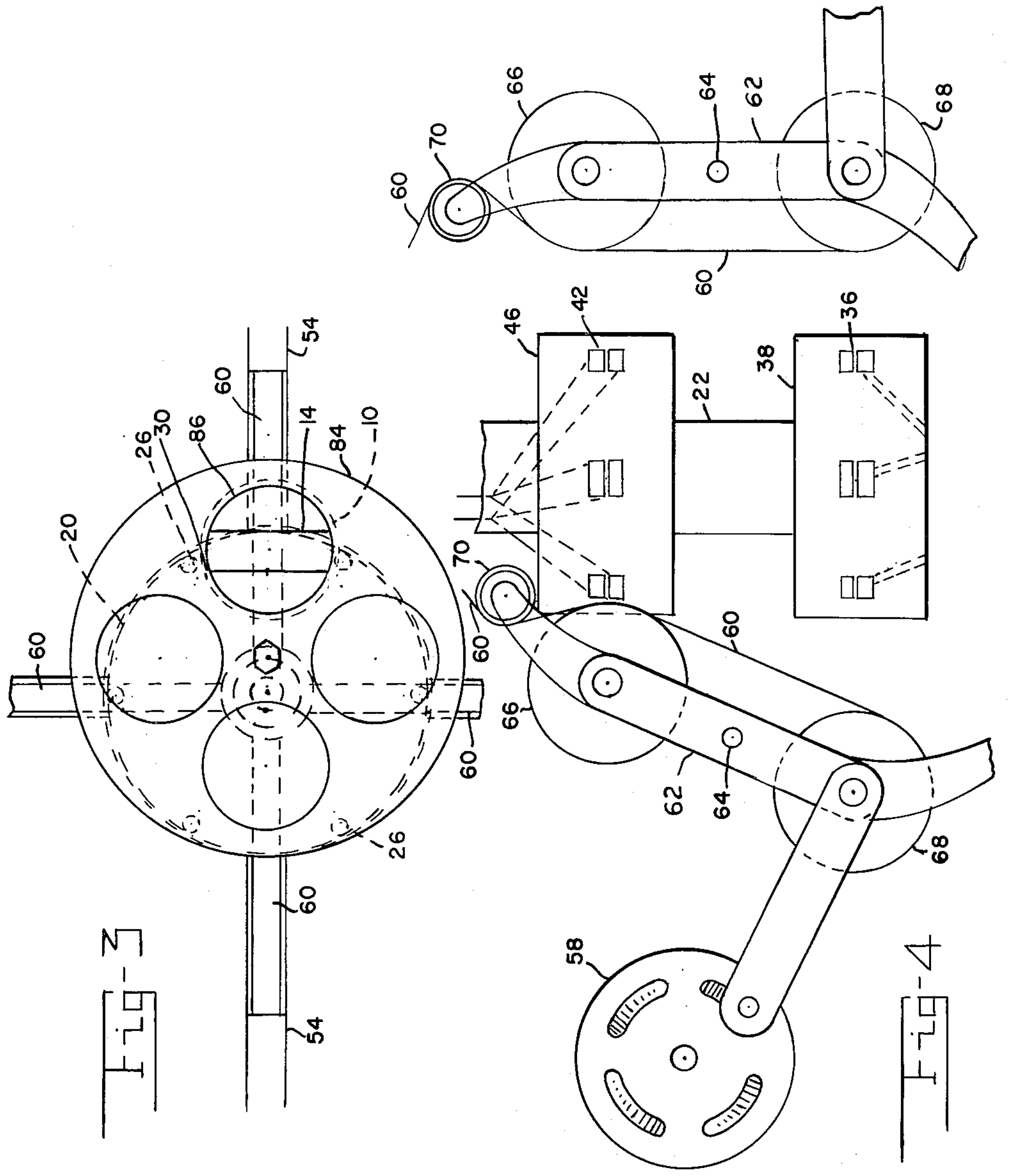
FIG. 3 is a bottom plan view of the optical system.
FIG. 4 is an enlarged fragmentary elevation of the flip flop guides.

In an exemplary embodiment according to the invention, an optical system 10 is provided having an objective directed to the terrain 12 to be investigated and providing an optical image of the terrain in a fixed focal plane 14. An annular body 20 is mounted on the end of a hollow shaft 22 driven by a driving device such as an electric motor 24. A plurality of photoelectric cells 26 are mounted on the annular body 20 which is rotated by the motor 24 to scan the photocells 26 successively through the image in the focal plane 14. Preferably, these cells 26 are spaced around the periphery of the annular body to provide a synchronizing space 30 between each scan of the image in the focal plane 14. If desired, each of the photocells 26 may be provided with an optical magnifier 28. The cells 26 are connected in parallel to a suitable amplifier 32 and the output of the amplifier 32 is connected in parallel to a plurality of recording heads 36 mounted in the periphery of a substantially cylindrical carrier 38 mounted on the hollow shaft 22.

A second carrier 40 is likewise mounted on the shaft and has a plurality of magnetic read-out heads 42 connected in parallel to an output line 44 connected to a transmit and receive device 50. A plurality of banks of magnetic tapes are mounted for cooperation with the recording and read-out heads 36 and 42. The magnetic tapes are mounted on conventional receiving and storage reels 52 and 54 which may be driven in any conventional manner such as by a motor 56 which may be connected to the reels 52 and 54 by means of a clutch and belt arrangement, not shown.

A three-position flip-flop guide 57 is mounted adjacent to the carriers 36 and 40 and controlled by means of a relay, herein shown as a Ledex relay 58 so that the tape 60 may be brought into proximity with either of the heads 36 or 42. The flip-flop guide 57 consists of a frame 62 mounted on an adjustable pivot 64 and having guide pulleys 66 and 68 having a concave annular surface which substantially interfits with the exterior surface of the carriers 38 and 40. Exterior take-up rollers 70 and 72 are mounted on the opposite ends of the frame 6? so that the tape 60 will continuously extend between the rollers 66 and 68. The tape 60 will normally be contained on the reel 54 and will feed across the guide rollers 66 and 68 and a plurality of intermediate guide rollers to take up reel 52.

The entire structure may be housed in a container 80 having suitable brackets 82 for mounting the reels and other objects thereon. The optical system 10 may be provided with a carrier 84 upon which is mounted a plurality of filter devices 86.

The entire device may be controlled by means of a command or programming device 90 so that the entire operation may be either preprogrammed or it may be operated by radio or other command system, or a combination of both.

In the utilization of the system it is mounted in a suitable vehicle such as an earth satallite, space probe or the like and the objective of the optical system 10 is directed toward the terrain 12 to be investigated. The motor 24 will rotate the hollow shaft 22, the first and second carriers 38 and 40 and the annular body 20. The rotation of the annular body 20 will successively traverse the photocells 26 across the image in the focal plane and since the vehicle will be moving forward at a high rate of speed, the successive traverse of the photocells 26 will scan successive lines 98 on the terrain being investigated. The intensity of the light in the focal plane 14 will determine the extent of the voltage generated by the photocells 26 which will be amplified by the amplifier 32 and distributed to the recording heads 36 which are connected in parallel to the output of the amplifier. The rotation of the carrier 38 will successively traverse the recording heads 36 across the magnetic tapes 60 which will be moving from reels 54 to 52 so that the bits of information picked up by the photocells will be recorded as blips on the magnetic tape 60 as recording lines 100. As the tape 60 is fed onto the receiving reel 52 it will continue to feed until such time as reel 54 is substantially empty, at which time a limit switch 102 will energize the relay 58 to lift the flip flop 62 to a neutral position and at the same time energize a flip flop in a succeeding bank to present another tape to the recording heads 36 so that the recording will be substantially continuous as long as a tape 60 is available. Obviously, any plurality of tapes 60 may be utilized. The system herein shown utilizes four banks of tapes 60 with each bank including its guide system, its take-up, storage and receiving reels.

The flip flop may be controlled to read out position by a predetermined programming in the programming device 90 or by command impulse received by transmitter receiver device 50. To transmit the intelligence on the tape 60, the tape 60 is rewound from the tape receiving reel 52 to the storage reel 54 and the flip flop operated to bring the tape 60 into contact with the read-out heads 42. In order to compensate for poor transmission, a protective system includes a plurality of take-up rollers 110, 112, 114 and 116 so that a relatively long length of tape 60 may be stored between the read-out heads 42 and eraser 120. Either on command or because of the prearranged programming, the recorded tape will be traversed pass the heads 42 and the intelligence transmitted by transmitter 50. If some condition makes transmission impossible or undesirable, the command system will stop the progress of the tape 60 so that the recorded information will not be erased by eraser 120 but will be held until such time as the transmitting conditions are better at which time the read-out may be accomplished and the eraser 120 will remove the recording from the tape 60. After the read-out of the tape 60, the tape will be returned to the storage reel 54 for use at a later time.

By utilizing a plurality of banks of recording tapes and associated apparatus, the information may be stored as long as there is tape available for recording by switching from bank to bank by means of the operation of the flip flop guides.

The amplifier 32 may be mounted on the frame 80, but is preferably mounted on the annular body 20 so that there will be a minimum of operating connections between the photocells 26 and the recording heads 36. When the amplifier 32 is mounted in the annular body 20, any sensitive portion of the amplifier should be mounted substantially on the axis of the hollow shaft 22 so as to prevent damage because of the speed of rotation.

With the device mounted in a satellite in polar orbit at a height of the order of 300 miles, the orbit time will be of the order of 90 minutes giving a ground speed of 23,470 feet per second. Then with a lens having ten inch diameter and forty inch focal length the width of the observed ground path 12 is 15 miles and the detectable ground area or bit of information is 50 feet x 50 feet.

A careful analysis has been applied to a set of parameters under which this device operates in space. The parameter are shown in the following table:

*Magrecon System Parameters*

| | | |
|---|---|---|
| (1) | Detectable ground elements | 50 ft. x 50 ft. |
| (2) | Coverage (transverse) ground | 15 miles. |
| (3) | Satellite altitude | 300 miles. |
| (4) | Orbit (90 minutes) | Polar. |
| (5) | Ground speed | 23,470 ft./sec. |
| (6) | Optics T 375, P 250, 1/mm., F 100/20[12] (3 x 3) | 2 x 2 format plane, f/4–10'' dia. 40'' f.l., f/4.0 10'' dia. 40'' f.l. |
| (7) | Photo electric cells | 6 at 2'' radius. |
| (8) | Magnetic heads | 6 record and read out at 3'' radius. |
| (9) | Scan rate | 470 scans/sec. |
| (10) | Motor speed | 4700 r.p.m. |
| (11) | Tape width | 3 inches. |
| (12) | Information "bits" | 1584 bits/scan or 745,000 bits/sec. |
| (13) | PE "bit" dwell time | 1.34 ms. |
| (14) | PE time constant | .13 ms. |
| (15) | Head-to-tape speed | 1410 in./sec. |

For purposes of exemplification, a particular embodiment of the invention has been shown and described according to the best present understanding thereof. However, it will be apparent to those skilled in the art that various changes and modifications in the construction and arrangement of the parts thereof may be resorted to without departing from the true spirit of the invention.

We claim:

1. An intelligence gathering system adapted for mounting on an extraterrestrial flying object comprising an optical system viewing a quest area and presenting an image on a focal plane, an annular body mounted for rotation in a plane parallel to the focal plane, a plurality of photoelectric cells mounted on said annular body and extending to said focal plane whereby the cells are responsive to the image intensity in said focal plane, an axial shaft for rotating said annular body to successively traverse said cells across said focal plane to scan the image, an amplifier, circuit means connecting said cells in parallel to said amplifier, a first substantially cylindrical carrier mounted in coaxial relation to said annular body, a plurality of magnetic recording heads mounted in the periphery of said first carrier, circuit means connecting the output of said amplifier to said recording heads, a second carrier mounted in coaxial relation to said first carrier, a plurality of magnetic read-out heads in the periphery of said second carrier, a driving device connected to said shaft for simultaneously rotating said annular body and said carriers, a magnetic tape, means for traversing said tape past said carrier, a three position tape guide operable to present said tape in operating position with either said recording heads, said read-out heads or a neutral position.

2. A system adapter for aerial reconnaissance comprising an optical system for presenting an image of an area in the focal plane of the optical system, a plurality of photocells, a rotatable body for successively traversing said photocells across said focal plane to scan the image, a first carrier, a plurality of magnetic recording heads mounted in spaced relation on said first carrier, circuit means connecting said recording heads in parallel to said photocells, a second carrier, a plurality of magnetic read-out heads mounted in spaced relation on said second carrier, a plurality of magnetic tapes, means for selectively traversing said tapes past said carriers, a flip flop guide for selectively presenting said tape to either said first or said second carrier, a shaft fixed to said first carrier, said second carrier and to said rotatable body for traversing said carriers with respect to said tape and a drive device connected to said shaft for synchronously rotating said carriers and said rotatable body.

3. In a reconnaissance system having a receiver, a transmitter and programming devices, an intelligence recorder comprising an optical system viewing the terrain to be studied and providing an image thereof, a scanner for scanning successive lines of said image, said scanner including a plurality of photoelectric cells, an annular body for successively traversing said cells across said image, a first rotatable carrier, a plurality of magnetic recording heads on said first carrier, circuit means connecting said recording heads in parallel to said cells, a second rotatable carrier, a plurality of magnetic read-out heads mounted on said second carrier, circuit means connecting said read-out heads to said transmitter, a drive shaft, said body and said carriers mounted in coaxial spaced relation on said drive shaft, a magnetic tape, a tape guide for selectively presenting said tape to said recording heads or said read-out heads.

4. In a reconnaissance system having a transmitter, a receiver and a programming device, an information collector comprising a hollow shaft, a drive device connected to rotate said shaft, a first and second carrier mounted on said shaft, an annular body mounted on said shaft, a plurality of photoelectric cells mounted in spaced relation on said annular body, an optical system viewing the territory to be studied, said optical system providing an image of the territory in a focal plane parallel to the plane of the annular body, said photocells extending into said focal plane, the distance between said photocells being greater than the diameter of the image in the focal plane, an amplifier, circuit means connecting said cells in parallel to said amplifier, a plurality of magnetic recording heads on the periphery of said first carrier, circuit means connecting the output of said amplifier to said recording heads in parallel, said circuit means extending through said hollow shaft, a plurality of magnetic read-out heads on the second carrier, a bank of magnetic tape including a three position tape guide for selectively presenting said tape to either said recording heads or said read-out heads or maintain a neutral position.

References Cited in the file of this patent

UNITED STATES PATENTS

| | | |
|---|---|---|
| 2,595,197 | Kuhlow | Apr. 29, 1952 |
| 2,832,820 | Blackstone | Apr. 29, 1958 |
| 2,856,462 | Lyon | Oct. 14, 1958 |
| 2,900,444 | Camras | Aug. 18, 1959 |
| 2,933,555 | Wootten | Apr. 19, 1960 |